United States Patent [19]
Herzberg et al.

[11] Patent Number: 5,345,507
[45] Date of Patent: Sep. 6, 1994

[54] SECURE MESSAGE AUTHENTICATION FOR BINARY ADDITIVE STREAM CIPHER SYSTEMS

[75] Inventors: Amir Herzberg, Bronx; Hugo M. Krawczyk, Riverdale, both of N.Y.; Shay Kutten, Rockaway, N.J.; Yishay Mansour, Tel-Avi, Israel

[73] Assignee: International Business Machines Corporation, Armonk, N.Y.

[21] Appl. No.: 118,080

[22] Filed: Sep. 8, 1993

[51] Int. Cl.$^5$ ............................................. H04L 9/28
[52] U.S. Cl. ...................................... 380/28; 380/44; 380/46
[58] Field of Search ................... 380/28, 44, 46, 50

[56] References Cited

U.S. PATENT DOCUMENTS

| | | | |
|---|---|---|---|
| 4,685,132 | 8/1987 | Bishop et al. | 380/46 |
| 4,771,463 | 9/1988 | Beeman | 380/46 |
| 4,797,921 | 1/1989 | Shiraishi | 380/28 |
| 4,860,353 | 8/1989 | Brown | 380/50 |
| 5,054,066 | 10/1991 | Riek et al. | 380/50 |
| 5,220,606 | 6/1993 | Greenburg | 380/28 |

*Primary Examiner*—Salvatore Cangialosi
*Attorney, Agent, or Firm*—Whitham, Curtis, Whitham & McGinn

[57] ABSTRACT

A method of verifying the authenticity of a message transmitted from a sender to a receiver in a communication system is partitioned into three stages. In the first stage, a key is secretly exchanged between the sender and receiver. This key is a binary irreducible polynomial p(x) of degree n. In addition, the sender and receiver share an encryption key composed of a stream of secret random, or pseudo-random bits. In the second stage, the sender appends a leading non-zero string of bits, which, in the simplest case, may be a single "1" bit, and n tail bits "0" to M to generate an augmented message, this augmented message considered as a polynomial having coefficients corresponding to the message bits. If the length of the message is known and cryptographically verified, then there is no need for a leading "1". The sender then computes a polynomial residue resulting from the division of the augmented message polynomial generated by the key polynomial p(x) exchanged by the sender and receiver. The sender encrypts the computed residue. Preferably, the encryption is done by performing a bitwise Exclusive OR operation between the bits of the residue and the stream of secret bits shared by the sender and receiver. The sender then transmits the message M and the encrypted residue. The third stage is performed by the receiver by decrypting the transmitted encrypted residue at the time of reception. The receiver then appends the decrypted residue to the end of the received message M to obtain a combined bit stream M'. The receiver computes the residue of the division between the binary polynomial represented by the bit stream M' and the key polynomial p(x) exchanged by the sender and receiver. The receiver accepts a received message M as authentic only if the residue computed is zero.

14 Claims, 5 Drawing Sheets

SECURE MESSAGE AUTHENTICATION FOR BINARY ADDITIVE STREAM CIPHER SYSTEMS

BACKGROUND OF THE INVENTION

1. Field of the Invention

The present invention generally relates to a method to allow a receiver of a message to verify the message integrity (i.e., that the received message is identical, with high probability, to the message at the time of sending) and, more particularly, to a method that protects the integrity of messages that are encrypted by stream ciphers, and protects them against changes by a malicious attacker. The invention also serves to detect when synchronization is lost between the sender and receiver, thus enabling resynchronization.

2. Description of the Prior Art

Authentication is a process which proves that someone or something is valid or genuine. In a computer system or communications network, authentication is an important part of data security. All authentication schemes check the validity of one or more parameters. For example, authentication of a person's identity requires a test in which a secret or nonforgeable parameter is supplied by that person with a claimed identity (ID). By checking the validity of the supplied parameter (ID), the system can decide whether the person is who he claims to be.

Message authentication is a process that allows the receiver of a message to verify its integrity; i.e., to verify the fact that the received message is identical (with high probability) to the message at the time of sending. Cyclic redundancy codes (CRCs) are widely used for error detection in communication networks. Such codes are generated by a polynomial division. However, message authentication using CRCs is usually performed on transmitted data with no connection to security, but just as means to detect involuntary alteration. For security purposes, a mechanism is required to prevent a malicious intruder from modifying the message contents, including the originator and destination address, without the alteration being detected. Standard mechanisms, such as CRC, are not capable of dealing with malicious intervention since they are fixed and known procedures, and thus allow any intruder to authenticate any message of its choice.

M. O. Rabin in "Figerprinting by Random Polynomials", Tech. Rep. TR-15-81, Center for Research in Computing Technology, Harvard Univ., Cambridge, Mass. (1981), proposed a fingerprint function which, like CRCs, uses a polynomial division as its basic authentication operation. In the Rabin method, the checksum is not transmitted and is therefore not available to authenticate the message.

Cryptography offers a highly secure means to authenticate transmitted messages. However, while some message encryption methods may provide some integrity check as a by-product, the common encryption method of Additive Stream Cipher cryptosystems does not help the task of message authentication at all. Thus, the need for a message authentication mechanism is even greater then when using other encryption methods. In fact, when using these methods of encryption, it is very easy to modify a message even after encryption. Indeed, if C is the ciphertext corresponding to the message M (that is, C=E(M), where E is the encryption function), then C⊕M' is the ciphertext corresponding to M⊕M', since C⊕M'=E(M⊕M'). Here the symbol "⊕" denotes a bitwise Exclusive OR operation. Therefore, by intercepting an encrypted message M, one can easily modify its contents to M⊕M' without being noticed by the decryption algorithm. A secure message authentication method should detect any tampering of the encrypted data, with high probability.

In addition, the authentication process (which is performed on the plain data, i.e., before encryption and after decryption) serves as a certificate of correct decryption, a feature which is essential to verify encryption/decryption synchronization between sender and receiver in stream cipher systems. In such systems, the sender and receiver need to synchronize the changes in their states; otherwise, a correct decryption is not possible. In addition, the authentication method must be very fast in order to support high data transmission rates.

SUMMARY OF THE INVENTION

It is therefore an object of the present invention to provide a fast, secure message authentication for binary additive stream cipher systems which protects against changes to the message, including the originator and destination address, by a malicious attacker.

It is another object of the invention to provide a secure message authentication system which detects the case that synchronization is lost between the sender and receiver to enable resynchronization.

According to the invention, the method of verifying the authenticity of a message transmitted from a sender to a receiver in a communication system may be partitioned into three stages; actions taken before a communication between the sender and receiver, actions taken by the sender in the process of transmitting a message, and actions taken by the receiver upon receipt of a message to authenticate the message. In the first stage, a key is secretly exchanged between the sender and receiver. This key is a binary irreducible polynomial p(x) of degree n. In addition, the sender and receiver share an encryption key composed of a stream of secret random, or pseudo-random bits. In the second stage, the sender appends a leading non-zero string of bits, which, in the simplest case, may be a single "1" bit, and n tail bits to M to generate an augmented message M'. This augmented message will be viewed in the practice of the invention as a polynomial having coefficients corresponding to the message bits. In a preferred embodiment, the n tail bits are all zeros, but an arbitrary string S of n bits could be used instead. If the length of the message is known and cryptographically verified, then there is no need for a leading non-zero string or, alternatively, the leading "1" bit. The sender then computes a polynomial residue by dividing the augmented message polynomial M' by the key polynomial p(x) exchanged by the sender and receiver. The sender encrypts the computed residue. In the preferred embodiment of the invention, the encryption is done by performing a bitwise Exclusive OR operation between the bits of the residue and the stream of secret bits shared by the sender and receiver. The sender then transmits the message M and the encrypted residue. Optionally, the message M may also be encrypted, but this is not necessary for the authentication process according to the invention.

The third stage is performed by the receiver by decrypting the transmitted encrypted residue at the time of reception. Again, in the preferred embodiment of the invention, this is done using a bitwise Exclusive OR operation between the bits of the residue and the stream of secret bits shared by the communicating parties. The receiver then appends the decrypted residue to the end of the received message M to obtain a combined bit stream M'. The receiver computes the residue of the division between the binary polynomial represented by the bit stream M' and the key polynomial p(x) exchanged by the sender and receiver. The receiver accepts a received message M as authentic only if the residue computed is zero.

While the preferred embodiment of the invention uses a bitwise Exclusive OR function with a random or pseudorandom bit stream to encrypt (and decrypt) the residue, other encryption methods could be used. However, an important feature of the invention is that the system is provable secure using this binary additive stream cipher system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the practice of the invention, the communicating parties first exchange an encryption key to be used with an encryption function E(.). A particular advantage of the invention is that the function E(.) can be also a stream cipher encryption scheme. However, other kinds of encryption schemes can be used. The parties also exchange a polynomial p(x) of degree n over field GF(2) (the field of two elements, 0 and 1). The polynomial p(x) is chosen at random (i.e., with uniform probability) among all irreducible polynomials of degree n over field GF(2). The value of n is a security parameter known to the parties. It is chosen by the implementation according to the level of security desired. Both the encryption key and the polynomial p(x) are exchanged secretly.

M is defined as a message of length L with binary representation $M = M_0, M_1, \ldots, M_{L-1}$. $M(x) = x^L + M_{L-1}x^{L-1} + \ldots + M_1 x + M_0$ is defined as the polynomial of degree L over field GF(2) whose leading coefficient is 1, and other coefficients correspond to the bits in the message M. For example, if $M = 001101$, then $M(x) = x^6 + x^3 + x^2 + 1$, where $x^6$ is the leading "1" coefficient.

Figure 1:
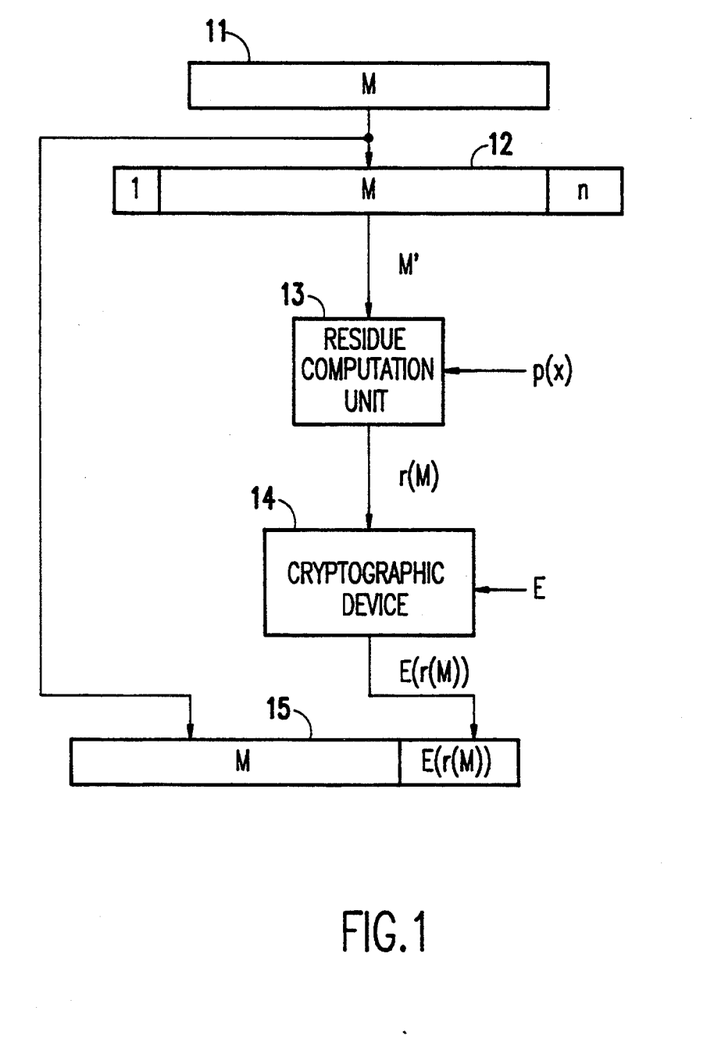
FIG. 1 is a block diagram showing the components of the sender.

Referring now to the drawings, and more particularly to FIG. 1, there is shown the basic components of the sender in a communication system. The message M to be sent is conceptually illustrated in box 11. A copy of the message is loaded, either serially or in parallel, into a virtual buffer 12 (preferably not a hardware register) having a greater number of bit positions than the number of bits in the message M. In the preferred embodiment, the virtual buffer 12 has $L+n+1$ stages, were L is the length of the message M, and includes a leading bit position which is preset to a "1" and n low order bit positions which are preset to "0". It will be understood by those skilled in the art that the message M could be shifted into the virtual buffer 12 by $L+n$ clock pulses which has the effect of multiplying (in binary) the message M(x) by a polynomial $x^n$. This augmented message M' in virtual buffer 12 is then subjected to a residue computation in computation unit 13 using a random number polynomial p(x). The preferred residue computation unit 13 is described in more detail with reference to FIG. 5 below. The computed residue is then encrypted in a secure cryptographic device 14 using an encryption key previously exchanged between the sender and receiver. The encrypted residue is then concatenated with the message in another virtual buffer 15, and the contents of the virtual buffer 15 are then transmitted to the receiver.

In the case in which the encryption is implemented as an additive stream cipher, the encryption key is the string of random bits for Exclusive ORing with the data or a seed for a pseudorandom generator for the generation of pseudorandom bits to be Exclusive ORed with the data. Cryptographic pseudorandom generators are well known in the literature. See for example Henry Baker and Fred Piper, *Cipher Systems*, John Wiley and Sons (1982). Also, methods for secretly exchanging keys are well known in the art. See for example J. G. Steiner et al., "Kerberos: An Authentication Service for Open Network Systems", *Usenix Conference Proceedings*, Winter 1988.

Figure 2:
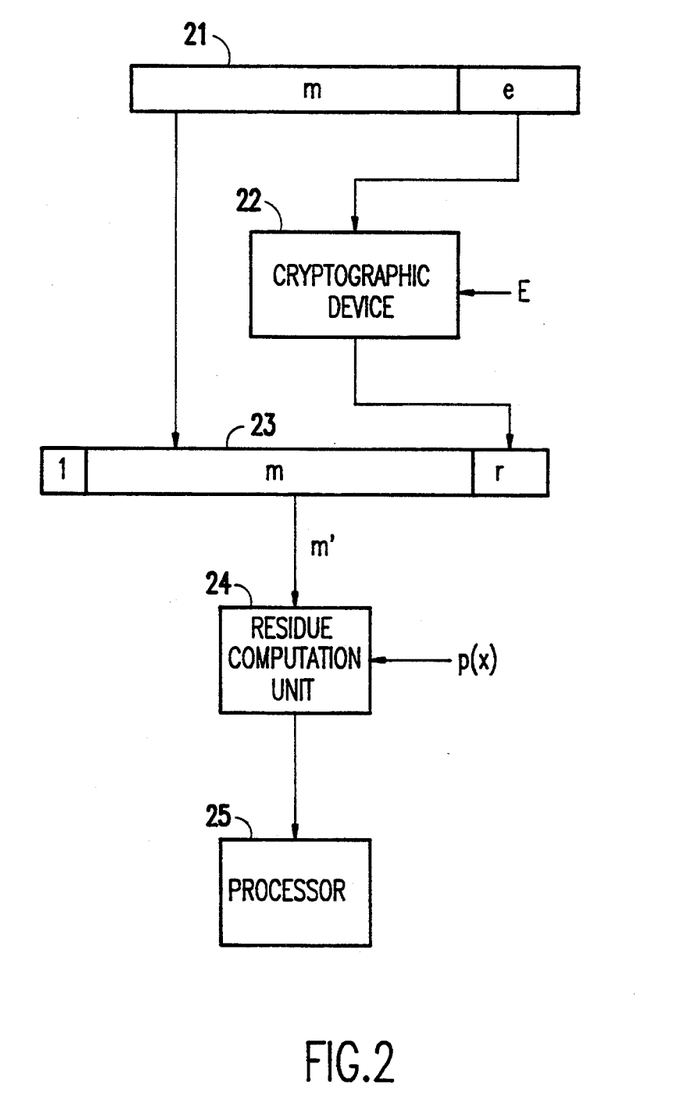
FIG. 2 is a block diagram showing the components of the receiver.

FIG. 2 shows the basic components of the receiver in the communication system. The received message, here denoted m, and the encrypted residue, here denoted e, are input to a virtual buffer 21. The received encrypted residue e is decrypted in a secure cryptographic device 22 using the exchanged encryption key. The decrypted residue, here denoted r, is concatenated with the received message m, and a leading "1" bit is preset in another virtual buffer 23. Again, it will be understood that this is the simplest case and the leading "1" bit could be a non-zero string. Thus, an augmented received message m' is formed in the virtual buffer 23 corresponding to the augmented message M', and this polynomial m' is subjected to a residue computation in computation unit 24 using the random polynomial p(x). Again, the preferred residue computation unit 24 is identical to the residue computation unit 13 and described in more detail with reference to FIG. 5 below. Processor 25 examines the result of the residue computation and if the result is zero, the message is accepted as being authenticated; otherwise, the message is rejected as invalid.

Figure 3:
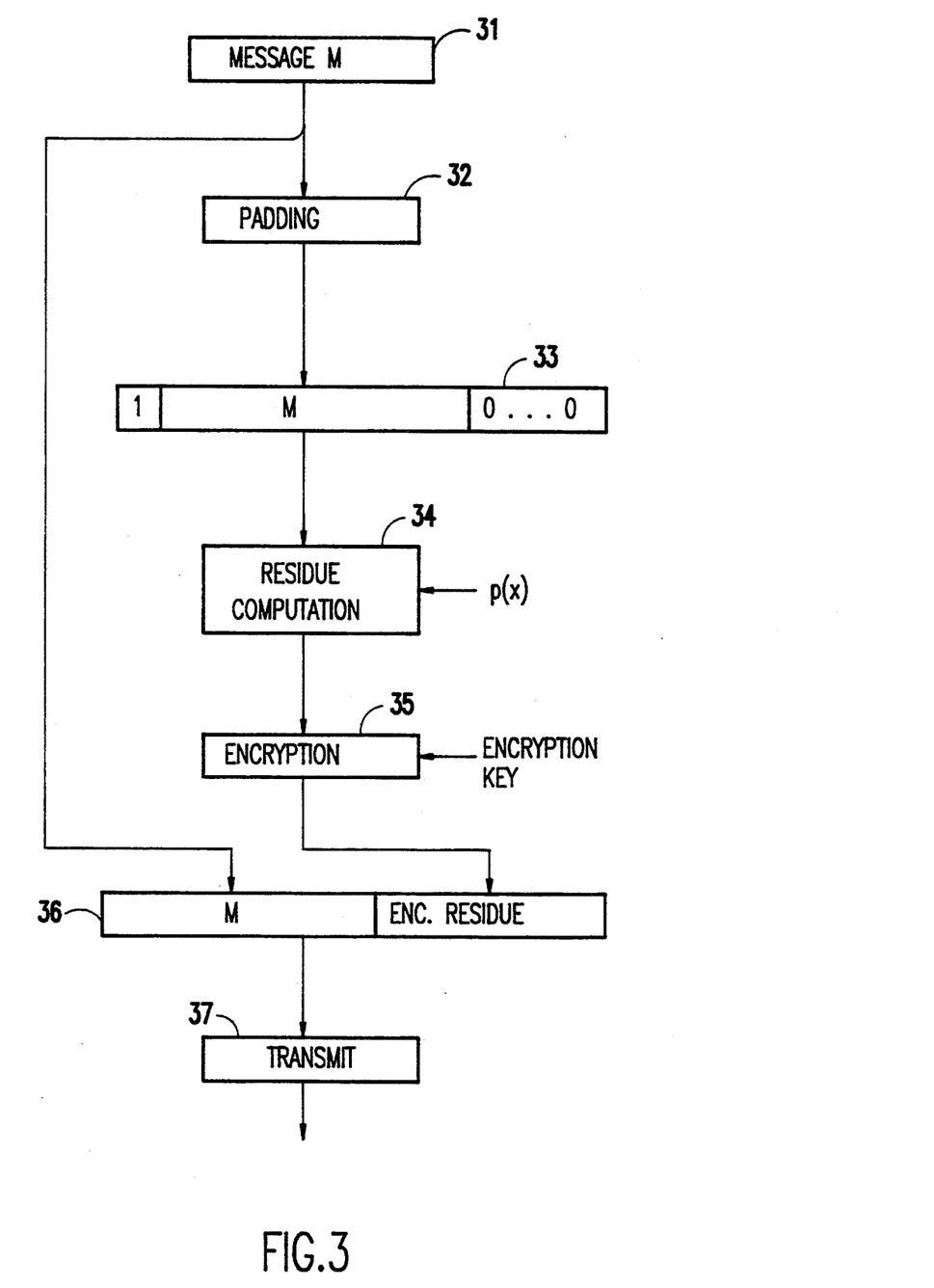
FIG. 3 is a flow diagram showing the steps performed by the sender for each message M.

Referring now to FIG. 3, the steps performed by the sender for a message M will now be described. For each message M input at function block 31 to be transmitted, the message is padded in function block 32 to generate an augmented polynomial M', generally defined as $M(x) \times x^n$. In the preferred embodiment, this padding step appends a leading "1" bit and n tail "0" tail bits to produce the augmented polynomial M' at 33. The first step is to compute at function block 34 the residue of the division of the polynomial $M(x) \times x^n$ by the polynomial p(x). r(x) is the resulting residue polynomial, and r(M) is the string of n bits corresponding to the coefficient in r(x). The string r(M) may have leading zeros. r(M) is called the check-sum. The second step performed by the sender is to encrypt the check-sum string r(M) at function block 35 using the encryption function E(.) to obtain E(r(M)). Since the object is to provide authentication for stream cipher, the encryption is done by Exclusive Oring the check sum with a stream of "key pad" bits. Other encryption schemes may also be used. Next, the sender appends to the message M the string E(r(M)) to verify the integrity of a message to form the string 36 and transmits both in function block 37. The message may be encrypted or plain text.

Figure 4:
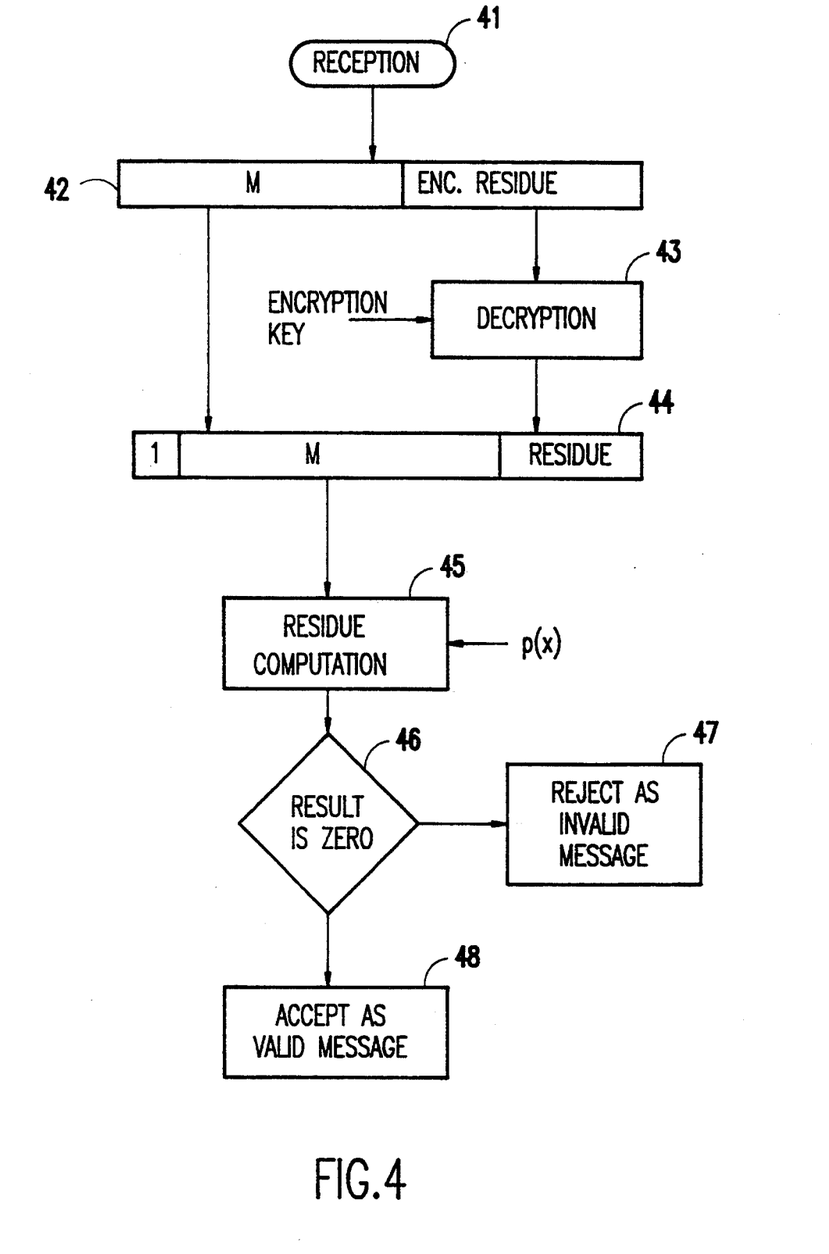
FIG. 4 is a flow diagram showing the steps performed by the receiver for each message M.

Referring next to FIG. 4, the steps performed upon reception 41 by the receiver for each message m received will now be described. As just described, the string transmitted includes both the message M and the string E(r(M)) which is the encrypted residue generated by the sender. The received string is represented at 42, but the string representing the encrypted residue will here be represented as e. First, the receiver decrypts e at function block 43 to obtain r, where the received pair m,e corresponds to M and E(r(M)) transmitted by the sender. If M was transmitted in encrypted form, then m is decrypted too. Next, the receiver concatenates the string r to the end of m at 44 and appends a leading "1" bit to generate an augmented message m'. The concatenated string 44 is denoted by m', and m'(x) denotes the polynomial over field GF(2) corresponding to m'; i.e., its leading coefficient being "1" and other coefficients corresponding to the bits of m'. The receiver then computes at function block 45 the residue of the division of m'(x) by the key polynomial p(x). A test is made in decision block 46 to determine if the result is zero. If this residue is zero (the zero polynomial), the authentication succeeds; that is, the message m is accepted at function block 48 as the correct transmitted message M. Otherwise, the validity of the message m is rejected at function block 47.

In cases in which messages are encrypted before transmission, the check-sum string is computed on the plain message, then concatenated to the message, and the resultant data (message plus check-sum) encrypted as a unit. Similarly, upon reception, decryption is performed on the concatenated data as a unit, and then checked for integrity.

If a message and corresponding (encrypted) check-sum were received unaltered, then the authentication succeeds. If the encryption function is a binary additive stream cipher, then any alteration of the message and/or check-sum done by an adversary which (a) is not able to break the encryption and (b) does not know the key polynomial p(x) is detected with probability of $L/(2^n)$, where L is the length of the message and n is the security parameter. For example, for L=30,000 and n=37, this probability is less than $$\frac{1}{4 \times 10^6}.$$

The above is true even after the adversary has seen several pairs of messages and corresponding encrypted check-sums. In other words, as long as the cryptosystem is secure, so also is the message authentication. While the method is applicable with any encryption function, the invention is preferably practiced using a binary additive stream cipher.

Figure 5:
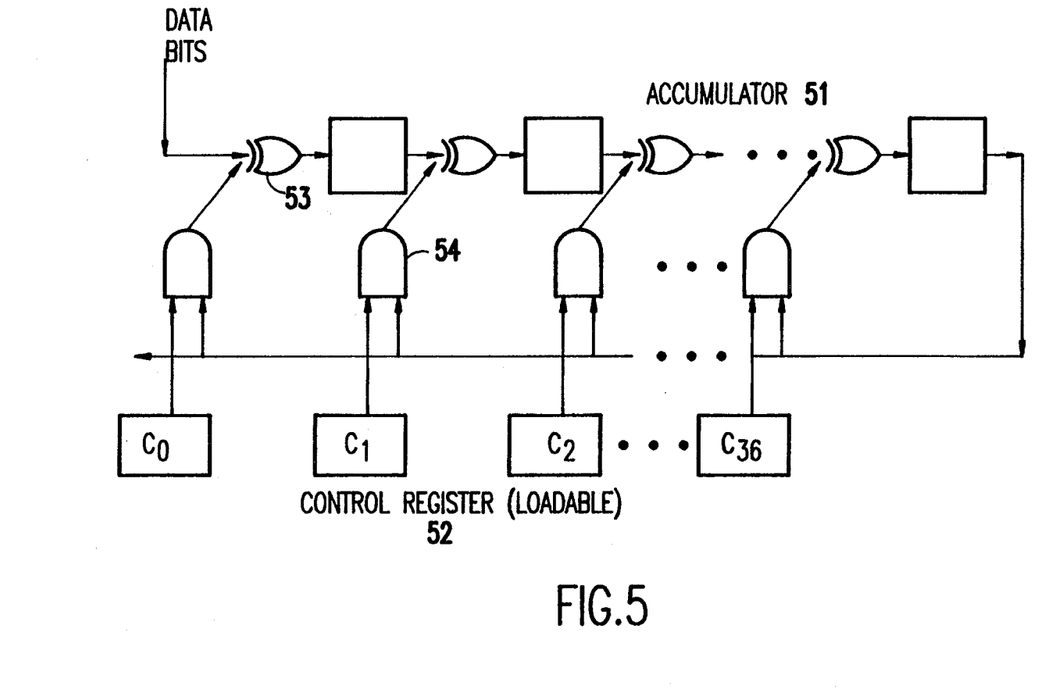
FIG. 5 is a block and logic diagram of the hardware used to compute a polynomial division residue.

The basic operation to be performed at both the sender and receiver is the computation of a polynomial division residue. This can be achieved with a simple hardware circuit, the main components of which are shown in FIG. 5, to which reference is now made. A shift register 51, called the accumulator, and a control register 52, both containing n stages, are used to generate the residue. The stages of the accumulator 51 are interconnected by n Exclusive OR gates 53. The control register 52 is programmable (i.e., loadable from memory) and will contain the coefficients of the polynomial p(x) except for its leading coefficient, which is omitted. The data bits flow through the accumulator 51, and a feedback bit is generated at the last stage of the shift register. This feedback bit is connected to an enabling input of n AND gates 54 which, when enabled by a "1" feedback bit, supply the content of the control register to corresponding ones of the Exclusive OR gates 53. Thus, depending on the feedback bit, an Exclusive OR operation is performed between the bits of p(x) stored in the control register 52 and the current contents of the accumulator 51.

For computing the check-sum (i.e., the authentication string), the accumulator 51 is initialized to contain all zeros, except for its first (leftmost) stage which is initialized to "1". Then, the data bits are shifted through the accumulator 51 for L+n clock pulses, where L is the number of data bits and n is the accumulator length. The final contents of the accumulator 51 (after the L+n shifts) is the value of the check-sum. It should be noted that initializing the first accumulator stage to "1" has the effect of padding the message M to be authenticated with a leading "1", therefore avoiding the explicit addition of this bit to the message M. Similarly, shifting by n extra pulses (after the L data bits were shifted through the accumulator) has the effect of padding the message M with n tailing "0s". The process of verifying the authentication at the receiver is similar and uses the same hardware device. For the purpose of checking, the concatenation of the message and the check-sum is a unique string (of length L+n). The accumulator is initialized as before (i.e., "1" in the first cell and zeros otherwise), and then the concatenated string flows through the accumulator 51 for L+n shifts after which the contents of the accumulator are checked. If it contains all zeros, the authentication is successful; otherwise, an error is detected.

Alternatively, the accumulator can be initialized (e.g., in parallel) to contain the n−1 first bits of data in the first n−1 stages and "1" in the last stage. In this case, L+1 shifts suffice to compute the check-sum. Choosing the random irreducible polynomial p(x) is usually done in software by using known techniques of irreducibility testing. Fast implementation in hardware is also possible. The length n should be fixed depending on the length of messages in the system, and it is better to choose it as a prime number for facilitating the irreducibility testing. Such tests are known in the literature.

An alternative to the appending of n "0s" to the end of the message is to append any arbitrary string S of n bits. In such a case, the verification of a message is done as described above, but instead of comparing the final state of the accumulator to zero, it would be compared to the same string S.

Whether to change the key polynomial p(x), and how frequently to do it, depends on the confidence on the encryption function and ability to keep the keys secret. One could also used a fixed, but randomly chosen, polynomial. In this case, the hardware can be tailored for the specific polynomial which may lead to more efficient or less expensive implementation. However, this demands the impossibility for an attacker to derive the polynomial from the hardware itself. It also requires a high quality encryption function; otherwise, a partial leak of information may, after long period of use, give too much information on the value of p(x). Once the polynomial is known to an adversary, the authentication method is useless.

Since the message authentication mechanism is implemented using shift registers, these same or other shift registers may be used to implement the stream cipher system itself. This simplicity of structure allows its use in high speed applications and has the additional advantage of lowering the cost of the hardware. The preferred embodiment of the invention takes advantage of existing knowledge on fast implementations of CRCs but without the limitation that a CRC is usually defined as a standard. More particularly, the invention may use parallelization techniques for speeding the residue computation that require permuting the order of bits in the data stream. Such a permutation is not in accordance with CRC standards.

This invention when used in conjunction with a stream cipher encryption system provides the communicating parties with a method to discover loss of synchronization in their encryption streams. Indeed, when this synchronization is lost, the encrypted messages will fail the authentication mechanism with very high probability (even if this loss is caused by malicious intervention). In such a case, the parties can try retransmission of the message and/or entering a state of resynchronization according to the particular communication protocol being used. Resynchronization can be done, for example, by exchanging a new secret encryption key.

While the invention has been described in terms of binary polynomials, (i.e., over the field GF(2)), in a more general case, the invention can be used by considering the messages as composed of characters from a different finite field F. In this case, both the irreducible polynomial p(x) and the residue computation are performed over that field F. Also, the padding one and zeros should be considered as the one and zeros over the field F. Thus, those skilled in the art will recognize that the invention can be practiced with modification within the spirit and scope of the appended claims.

Having thus described our invention, what we claim as new and desire to secure by Letters Patent is as follows:

1. In a communication system, a method of verifying the authenticity of a message transmitted from a sender to a receiver comprising the steps of:
   (a) secretly exchanging between the sender and receiver an encryption key and an irreducible polynomial p(x) of degree n;
   (b) for each message M to be transmitted by the sender, appending a leading non-zero string and n tail bits to the message M to generate an augmented message M' that corresponds to a polynomial having coefficients corresponding to bits of the message M;
   (c) computing a polynomial residue r resulting from the division of the polynomial corresponding to the augmented message M' generated in step (b) by the polynomial p(x) exchanged in step (a);
   (d) encrypting the residue computed in step (c) using the encryption key exchanged in step (a);
   (e) transmitting the message M and the encrypted residue generated in step (d);
   (f) decrypting by the receiver the transmitted encrypted residue at the time of reception using the encryption key exchanged in step (a);
   (g) concatenating the decrypted residue in step (f) with a received message m and appending a non-zero leading string to generate an augmented received message m';
   (h) computing a residue r of a division between a polynomial represented by the augmented message m' and the polynomial p(x) exchanged in step (a); and
   (i) accepting the received message m as authentic only if the residue computed in step (h) is a predetermined value.

2. The method recited in claim 1 wherein the step (b) is performed by appending a leading bit "1" as the non-zero string.

3. The method recited in claim 1 wherein the step (b) is performed by appending n "0s" as the tail bits and the predetermined value in step (i) is zero.

4. The method recited in claim 1 wherein the step (b) is performed by appending an arbitrary string S as the n tail bits and the predetermined value in step (i) is the string S.

5. The method recited in claim 1 wherein bits of the message M and polynomial coefficients are considered as elements over a non-binary finite field F, and the polynomial residue operation of steps (c) and (h) are performed over the field F.

6. The method recited in claim 1 wherein the steps (d) and (f) are performed by a bitwise Exclusive OR operation between bits of the residue and a stream of secret bits shared by the sender and receiver.

7. The method recited in claim 6 wherein said stream of secret bits are random.

8. The method recited in claim 6 wherein said stream of secret bits are pseudorandom.

9. The method recited in claim 1 further comprising the steps of encrypting by the sender the message M prior to the step (e) and decrypting by the receiver the message m prior to appending the decrypted residue to the end of the received message in step (f).

10. A communication system wherein an encryption key and an irreducible polynomial p(x) of degree n are secretly exchanged between the sender and receiver, said communication system comprising:
   a first buffer containing a message M to be transmitted by the sender and in which a leading non-zero string and n tail bits are appended to the message M to generate an augmented message M' that corresponds to a polynomial having coefficients corresponding to bits of the message M;
   a first divider for computing a polynomial residue r resulting from the division of the polynomial corresponding to the augmented message M' by the polynomial p(x);
   a first cryptographic device for encrypting the residue r using the encryption key;
   a transmitter for transmitting the message M and the encrypted residue from the first cryptographic device;
   a receiver for receiving a transmitted message m and encrypted residue;
   a second cryptographic device for decrypting transmitted encrypted residue using the encryption key;
   a second buffer in which the decrypted residue is concatenated with the received message m and a non-zero leading string is appended to generate an augmented received message m';

a second divider for computing a residue r of a division between a polynomial represented by the augmented message m' and the polynomial p(x); and a processor accepting the received message m as authentic only if the residue computed by the second divider is a predetermined value.

11. The communication system recited in claim 10 wherein a leading bit "1" is appended as the non-zero string.

12. The communication system recited in claim 10 wherein n "0s" are appended as the tail bits and the processor accepts the received message m as authentic when the predetermined value is zero.

13. The communication system recited in claim 10 wherein an arbitrary string S is appended as the n tail bits and the processor accepts the received message m as authentic when the predetermined value is the string S.

14. The communication system recited in claim 10 wherein said first and second dividers each comprise:

an accumulator register having n stages, said accumulator being initialized to contain all zeros except for a first stage which is initialized to "1", data bits being shifted through the accumulator register with L+n clock pulses, where L is a number of data bits;

a plurality of Exclusive OR gates, each of the Exclusive OR gates being disposed between adjacent stages of the accumulator register;

a control register having n stages and loadable with said polynomial key p(x); and a plurality of AND gates, each AND gate connected to be enabled by an output of a last stage of the accumulator register and receiving an input from a corresponding one of the stages of said control register, an output of each AND gate being supplied to a corresponding one of said Exclusive OR gates, whereby the final contents of the accumulator register, after the L+n shifts, is a value of a check-sum.

* * * * *